(12) United States Patent
Hall et al.

(10) Patent No.: US 9,813,316 B1
(45) Date of Patent: Nov. 7, 2017

(54) IMPLEMENTING SCALABLE THROTTLED POLLER

(71) Applicants: James Gregory Hall, Kittery, ME (US); Garry D. Gerossie, Jr., Somersworth, NH (US); John Ahern, Chestnut Hill, MA (US)

(72) Inventors: James Gregory Hall, Kittery, ME (US); Garry D. Gerossie, Jr., Somersworth, NH (US); John Ahern, Chestnut Hill, MA (US)

(73) Assignee: CA, Inc., New York, NY (US)

( * ) Notice: Subject to any disclaimer, the term of this patent is extended or adjusted under 35 U.S.C. 154(b) by 345 days.

(21) Appl. No.: 14/097,558

(22) Filed: Dec. 5, 2013

(51) Int. Cl.
*H04L 12/26* (2006.01)

(52) U.S. Cl.
CPC .................... *H04L 43/08* (2013.01)

(58) Field of Classification Search
CPC ....... H04L 43/10; H04L 43/103; H04L 43/08; H04L 43/0805; H04L 43/0811; H04L 43/0823; H04L 43/0876
See application file for complete search history.

(56) References Cited

U.S. PATENT DOCUMENTS

| | | | | |
|---|---|---|---|---|
| 5,586,121 A | * | 12/1996 | Moura | H04B 7/18523 348/E5.008 |
| 6,182,165 B1 | | 1/2001 | Spilo | |
| 6,502,132 B1 | * | 12/2002 | Kumano | H04L 12/2697 709/224 |
| 7,319,671 B1 | * | 1/2008 | Mohan | H04L 12/66 370/242 |
| 7,912,950 B1 | * | 3/2011 | Saparoff | H04L 41/0233 709/223 |
| 2004/0146065 A1 | * | 7/2004 | Li | H04L 43/10 370/449 |
| 2007/0078976 A1 | * | 4/2007 | Taylor | G03G 15/5075 709/224 |
| 2008/0091773 A1 | * | 4/2008 | Hameen-Anttila | H04L 67/06 709/203 |
| 2012/0151046 A1 | * | 6/2012 | Weiss | G06F 21/604 709/224 |
| 2013/0117482 A1 | * | 5/2013 | Jain | G06F 17/30008 710/109 |

* cited by examiner

*Primary Examiner* — Arvin Eskandarnia
(74) *Attorney, Agent, or Firm* — Baker Botts L.L.P.

(57) ABSTRACT

A method includes receiving a polling time period and determining a respective polling time for each network device in a plurality of network devices, wherein each respective polling time is distributed evenly across the polling time period. The method further includes determining a time-out time span. The time-out time span includes a start time equivalent to a polling time period end time and an end time. The method additionally includes polling each network device in the plurality of network devices at each respective polling time. The polling includes sending a first message to a first particular network device, and, in response to sending the first message, listening for a response to the first message until the end time of the time-out time span. The polling further includes flagging the first particular network device for review after the end time of the time-out time span.

12 Claims, 4 Drawing Sheets

IMPLEMENTING SCALABLE THROTTLED POLLER

BACKGROUND

The present disclosure relates generally to pollers, and more specifically to implementing a scalable, throttled poller.

BRIEF SUMMARY

In accordance with one embodiment of the present disclosure, a method includes receiving a polling time period. The method also includes determining a respective polling time for each network device in a plurality of network devices, wherein each respective polling time is distributed evenly across the polling time period. The method further includes determining a time-out time span. The time-out time span includes a start time equivalent to a polling time period end time and an end time. The method additionally includes polling each network device in the plurality of network devices at each respective polling time. The polling includes sending a first message to a first particular network device at the respective polling time of the first particular network device. The polling also includes, in response to sending the first message, listening for a response to the first message until the end time of the time-out time span. The polling still further includes flagging the first particular network device for review after the end time of the time-out time span.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1A:
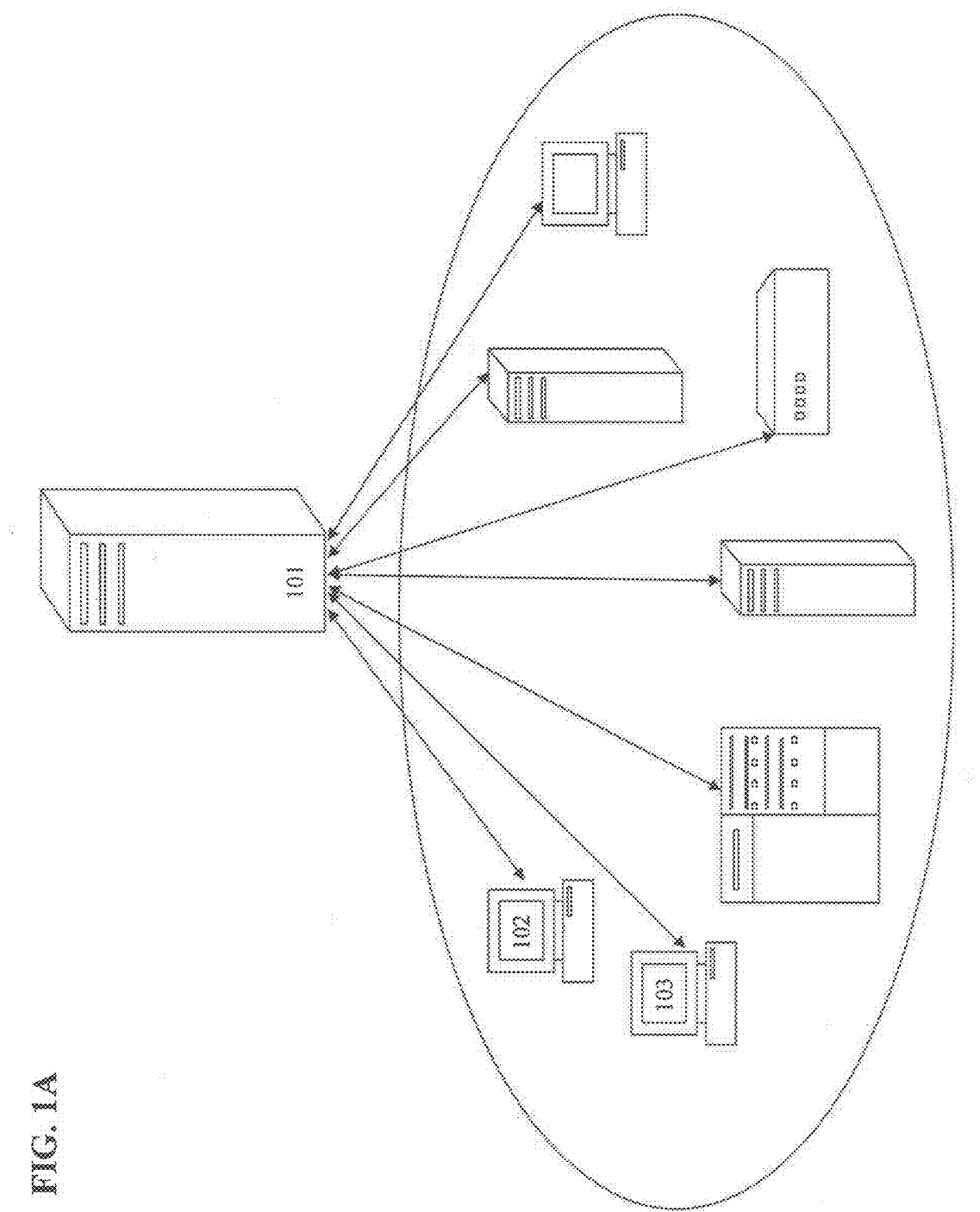
FIG. 1A is a diagram depicting a polling device in a network communication system according to an embodiment of the disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a note computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring to FIG. 1A, a network monitoring system may comprise a polling device 101. Polling device 101 may be connected to a communication network comprising a plurality of network devices, such as computers, routers, servers, peripheral devices, and the like. Polling device 101 may execute a polling process in which polling device 101 may poll each of the network devices in the communication network. For example, polling device 101 may send a polling request to each of the network devices to request communication status and information. Each of the network devices in the communication network may comprise a passive agent. The passive agent may receive the polling request from polling device 101 and may respond with the requested information, such as communication status. Polling device 101 may utilize a Simple Network Management Protocol ("SNMP") for the polling process. Other protocols, such as Hypertext Transfer Protocol ("HTTP"), Simple Object Access Protocol ("SOAP"), and the like, may also be utilized. Polling device 101 may poll the plurality of network devices in the communication network every polling cycle. For example, polling device 101 may send a polling request to each network device every five minutes, when the polling cycle is set at five minutes. These polling requests may result in substantial communication traffic that may overload the communication network.

Polling devices may apply a front loaded polling schedule, in which the polling devices may send requests to each of the network devices in the beginning of the polling cycle in order to complete each polling cycle as quickly as possible. Because all of the requests are sent to the network devices substantially at the beginning of the polling cycle, this front loaded polling schedule may overload the communication network. Thus, in the front-loaded polling schedule, network administration may be required to throttle the network communication to prevent overloading the communication network. Further, latency or retries in polling one network device may delay polling for the other network devices. Thus, administrative personnel may be required to manage latencies and timeouts. Therefore, a front-loaded polling schedule may not be compatible with cloud computing systems or distributed computing systems, such as Software as a Service ("SaaS") subscriber networks, which may require minimal network administration.

The present disclosure may provide a system and method for an effective polling process that polls each network devices within the scheduled polling cycle, without requiring certain network administration tasks (e.g., throttling and latency management tasks).

Figure 1B:
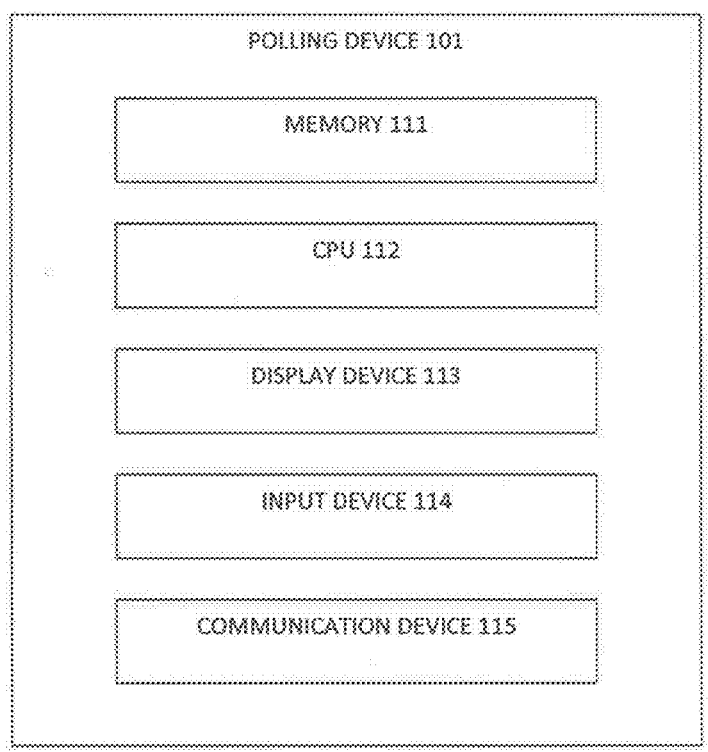
FIG. 1B is a schematic representation of a polling device according to an embodiment of the disclosure.

Referring to FIG. 1B, polling device 101 may include a memory 111 and a central processing unit ("CPU") 112. Memory 111 may store computer-readable programs or instructions, that when executed by CPU 112, controls polling device 101 to perform respective processes. For example, memory 111 may store computer-readable programs for performing a scalable throttled and latency tolerant polling process. Polling device 101 may include a display device 113, e.g., a computer screen, a touch screen, a projector, or the like. Display device 113 may receive instructions from CPU 112 to display information. For example, display device 113 may display the status and/or the results of a polling process. Display device 113 also may display menus for receiving user instructions for performing the polling process. Further, polling device 101 may include an input device 114, e.g., a keyboard, a mouse, a touch screen, or the like, that may receive user instructions or inputs. Polling device 101 also may include a communication device 115 that may send and/or receive data from other devices by wired communication, e.g., Ethernet, USB cable, or the like, or wireless communication, e.g., WiFi, Bluetooth, cellular, or the like. For example, CPU 112 may control communication device 115 to send polling requests to other devices in the network. Communication device 115 may receive responses from the other devices in the network responding to the polling requests. CPU 112 may control and facilitate the operations of the aforementioned devices.

Figure 2:
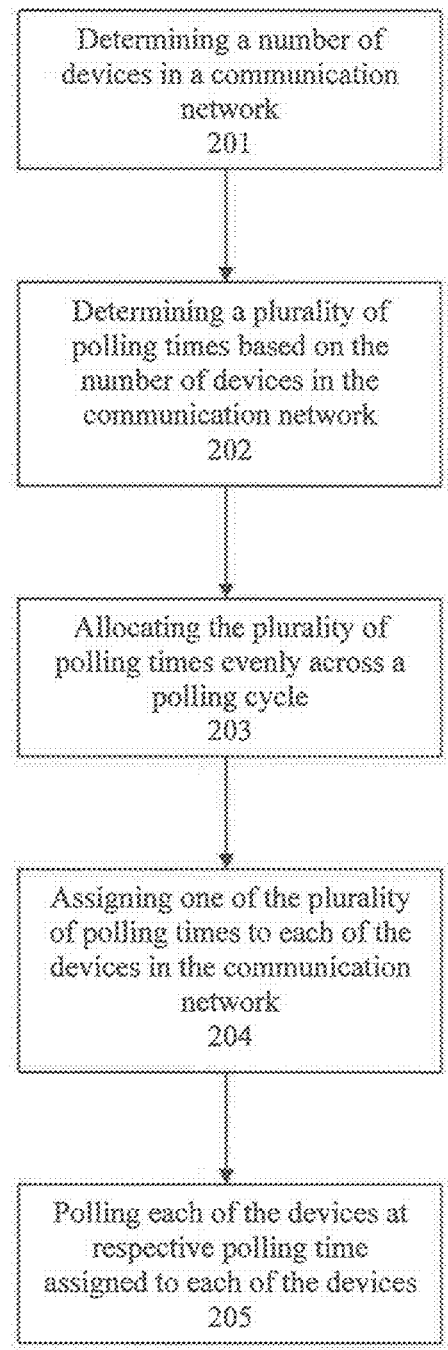
FIG. 2 is a flow chart depicting a method for a scalable throttled latency tolerant polling process according to an embodiment of the disclosure.

Referring to FIG. 2, polling device 101 may execute a scalable throttled and latency tolerant polling process. At step 201, polling device 101 may determine a number of network devices in the communication network. For example, polling device 101 may use a number of devices that responded to a previous polling as the number of network devices in the communication network. In another embodiment, polling device 101 may send ping requests to the devices connected to the network and may determine a number of devices connected to the network based on a number of responses received from the ping requests.

At step 202, polling device 101 may determine a plurality of polling times based on the number of devices determined in step 201. For example, when 1000 devices are connected to the communication network, polling device 101 may determine a polling time for each device, i.e., 1000 polling times. In certain embodiments, a polling time may refer to a time at which to begin polling a network device. At step 203, polling device 101 may spread the plurality of polling times evenly across a polling cycle. For example, when the number of network devices is 1000 and the polling cycle is 10 minutes, a time segment may be obtained by dividing the polling cycle by 1000, e.g., 10 minutes is divided by 1000 to result in a time segment of 0.6 seconds. Polling device 101 may determine an offset time for each of the plurality of polling times. The offset time for a polling time may be determined by multiplying an order number of a polling time by the time segment. For example, the 749th polling time may have an offset time of 449.4 seconds, e.g., 749 multiplied by 0.6 second, when the number of network devices is 1000 and the polling cycle is 10 minutes. Thus, one polling time may be set for every 0.6 seconds in the polling cycle of 10 minutes. Consequently, the plurality of polling times may evenly spread out across the entire polling cycle.

At step 204, polling device 101 may assign one of the plurality of polling times to each of the devices in the communication network. Polling device 101 may assign the plurality of polling times to the devices in the communication network in an order based on an IP address of the devices. For example, polling device 101 may start by assigning earlier polling times to the devices with a lower IP address number. In another embodiment, the plurality of polling times may be assigned to the devices in the communication network randomly. For example, polling device 101 may assign a random number to each of the network devices. When the number of network devices in the communication network is 1000, polling device 101 may obtain a randomized number between 1 and 1000 for each of the network devices. For example, when a random number of 749 is obtained for a particular network device, polling device 101 may assign the 749th polling time to the particular network device.

At step 205, polling device 101 may begin to poll the network devices in the communication network according to a schedule based on each network devices' polling time. For example, polling device 101 may send a polling request to network device 102 at an offset time of 449.4 seconds after the beginning of the polling cycle, when polling device 101 is assigned the 749th polling time. Because the plurality of polling times may spread out evenly within the polling cycle, polling requests sent to the plurality of network devices may be evenly distributed over the polling cycle. Thus, polling device 101 may automatically throttle the communication traffic of the polling process in the communication network to reduce network overload.

Figure 3:
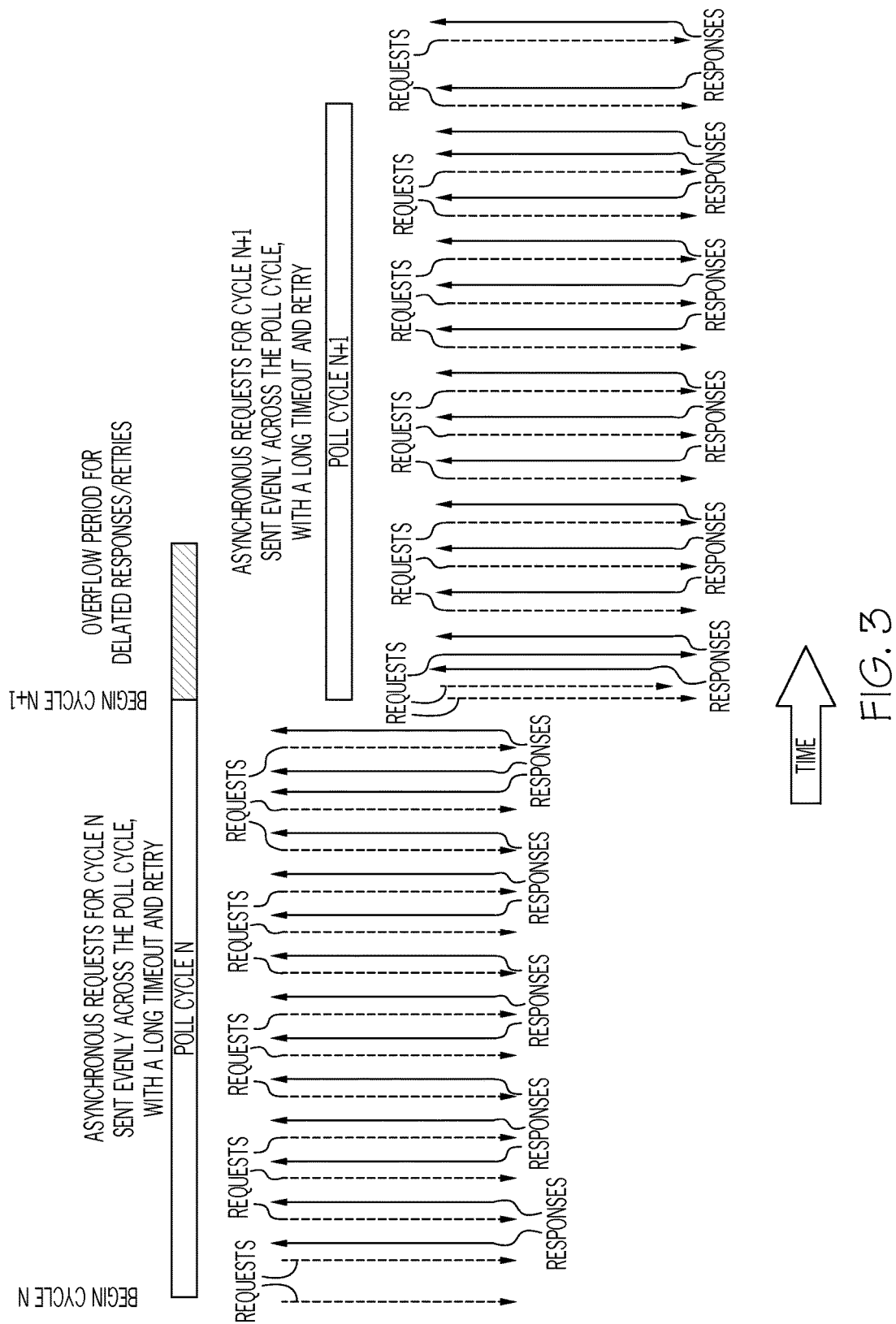
FIG. 3 is a graph illustrating a time line of a polling cycle N and a polling cycle N+1.

Referring to FIG. 3, polling device 101 may perform the scalable throttled and latency tolerant polling process in a polling cycle N and a polling cycle N+1. Polling cycle N+1 may be immediately subsequent to polling cycle N. As shown in a time-line diagram in FIG. 3, polling device 101 may send asynchronous polling requests to each network device in the communication network. Polling requests may be sent to each network device at a respective polling time in polling cycle N, such that the requests may be evenly distributed over polling cycle N.

Polling device 101 may perform retries when an initial polling for certain network devices is not successful. For example, polling device 101 may send a polling request to network device 102, but may not receive a polling response from network device 102. Polling device 101 may perform retries to attempt to poll network device 102 again. Polling device 101 may continue to perform retires after the end of polling cycle N. Delayed responses from network devices may also be received by polling device 101 after the end of polling cycle N. For example, polling device 101 may wait for a delayed response from a network device 103 for a predetermined timeout period. Polling device 101 may continue to perform retries and wait fir delayed responses from polling cycle N in an overflow period after the end of polling cycle N.

Polling device 101 may comprise a multi-core processor configured to execute processing in multiple threads simultaneously. Thus, polling device 101 may perform multiple polls to multiple network devices simultaneously. Polling device 101 may begin polling cycle N+1 while retires and delayed responses from polling cycle N are still being executed. Thus, polling cycle N+1 may not be delayed by retires and delayed responses from polling cycle N. For example, the overflow period from polling cycle N and polling cycle N+1 may overlap up to 50% of polling cycle N+1.

Accordingly, polling device 101 may execute the scalable throttled and latency tolerant polling process to automatically throttle the polling responses and distribute polling evenly across a polling cycle. Network administration may be minimized for throttling and managing the polling process. Further, polling device 101 may concurrently execute two polling cycles, such that retries and delays from a previous polling cycle may not delay polling in a next polling cycle. In addition, because the next polling cycle may be started without waiting for the end of the previous polling cycle, a higher timeout may be set for retries and delay responses in the previous polling cycle.

Polling device 101 may automatically determine the number of network devices and may distribute polling evenly over a polling cycle. Network utilization may be uniform over the polling cycle and network overload may be reduced.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the for disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:
1. A method comprising:
   determining a first respective polling time for each network device in a plurality of network devices based on a polling time period and a number of network devices in the plurality of network devices, wherein each first respective polling time is distributed evenly across the polling time period;

polling each network device at each first respective polling time to elicit a response, transmitted from each network device, comprising status information;

determining a first set of the plurality of network devices that responded to the polling within a time-out time span, the first set excluding at least one of the plurality of network devices;

determining a second respective polling time for each network device in the first set based on the polling time period and a number of network devices in the first set, wherein each second respective polling time is distributed evenly across the polling time period, and wherein time intervals between each second respective polling time are different than time intervals between each first respective polling time; and polling each network device in the first set at each second respective polling time.

2. The method of claim 1, wherein the polling at each first respective polling time further comprises:
sending a message to a particular network device at its respective polling time;
in response to sending the message, receiving a response to the message before an end time of the time-out time span, wherein the response to the message contains an error status indicator; and
in response to receiving the response to the message, re-polling the particular network device.

3. The method of claim 1, wherein the polling at each second respective polling time further comprises:
sending a message to a first particular network device at the second respective polling time; and
receiving a response to the message from the first particular network device.

4. The method of claim 1, further comprising:
receiving a time-out period; and
determining the time-out time span based on the time-out period.

5. A system comprising:
a processor; and
a computer-readable storage medium storing computer-readable instructions, which when executed by the processor, cause the processor to perform:
determining a first respective polling time for each network device in a plurality of network devices based on a polling time period and a number of network devices in the plurality of network devices, wherein each first respective polling time is distributed evenly across the polling time period;
polling each network device at each first respective polling time to elicit a response, transmitted from each network device, comprising status information;
determining a first set of the plurality of network devices that responded to the polling within a time-out time span, the first set excluding at least one of the plurality of network devices;
determining a second respective polling time for each network device in the first set based on the polling time period and a number of network devices in the first set, wherein each second respective polling time is distributed evenly across the polling time period, and wherein time intervals between each second respective polling time are different than time intervals between each first respective polling time; and
polling each network device in the first set at each second respective polling time.

6. The system of claim 5, wherein the polling at each first respective polling time further comprises:
sending a message to a particular network device at its respective polling time;
in response to sending the message, receiving a response to the message before an end time of the time-out time span, wherein the response to the message contains an error status indicator; and
in response to receiving the response to the message, re-polling the particular network device for review.

7. The system of claim 5, wherein the polling at each second respective polling time further comprises:
sending a message to a first particular network device at the second respective polling time; and
receiving a response to the message from the first particular network device.

8. The system of claim 5, wherein the computer-readable instructions further cause the processor to perform:
receiving a time-out period; and
determining the time-out time span based on the time-out period.

9. A computer program product comprising:
a non-transitory computer-readable storage medium having computer-readable program code embodied therewith, the computer-readable program code comprising:
computer-readable program code configured to determine a first respective polling time for each network device in a plurality of network devices based on a polling time period and a number of network devices in the plurality of network devices, wherein each first respective polling time is distributed evenly across the polling time period;
computer-readable program code configured to poll each network device at each first respective polling time to elicit a response, transmitted from each network device, comprising status information;
computer-readable program code configured to determine a first set of the plurality of network devices that responded to the polling within a time-out time span, the first set excluding at least one of the plurality of network devices;
computer-readable program code configured to determine a second respective polling time for each network device in the first set based on the polling time period and a number of network devices in the first set, wherein each second respective polling time is distributed evenly across the polling time period; and
computer-readable program code configured to poll each network device in the first set at each second respective polling time.

10. The computer program product of claim 9, wherein the polling at each first respective polling time further comprises:
sending a message to a particular network device at its respective polling time;
in response to sending the message, receiving a response to the message before an end time of the time-out time span, wherein the response to the message contains an error status indicator; and
in response to receiving the response to the message, re-polling the particular network device.

11. The computer program product of claim 9, wherein the polling at each second respective polling time further comprises:

sending a message to a first particular network device at the second respective polling time; and receiving a response to the message from the first particular network device.

12. The computer program product of claim 9, wherein the computer-readable program code further comprises:

computer-readable program code configured to receive a time-out period; and computer-readable program code configured to determine the time-out time span based on the time-out period.

* * * * *